(12) United States Patent
McCormick, Jr. et al.

(10) Patent No.: US 6,351,796 B1
(45) Date of Patent: Feb. 26, 2002

(54) METHODS AND APPARATUS FOR INCREASING THE EFFICIENCY OF A HIGHER LEVEL CACHE BY SELECTIVELY PERFORMING WRITES TO THE HIGHER LEVEL CACHE

(75) Inventors: James E McCormick, Jr., Fort Collins, CO (US); Steven Kenneth Saunders, Campbell, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/510,328

(22) Filed: Feb. 22, 2000

(51) Int. Cl.[7] .................................................. G06F 9/38
(52) U.S. Cl. ..................... 711/204; 711/122; 711/137; 711/207; 712/236; 712/240
(58) Field of Search ................................. 711/122, 137, 711/204, 207; 712/236, 240

(56) References Cited

U.S. PATENT DOCUMENTS

| | | | |
|---|---|---|---|
| 5,859,999 A | | 1/1999 | Morris et al. ................ 395/565 |
| 5,860,017 A | | 1/1999 | Sharangpani et al. .. 395/800.23 |
| 5,922,065 A | | 7/1999 | Hull et al. ...................... 712/24 |
| 5,935,241 A | * | 8/1999 | Shiell et al. .................. 712/240 |
| 5,978,909 A | * | 11/1999 | Lempel ........................ 712/240 |
| 6,108,777 A | * | 8/2000 | Puziol et al. ................ 712/240 |

OTHER PUBLICATIONS

"Patents shed light on Merced" by Alexander Wolfe, Electronic Engineering Times, Feb. 15, 1999, pp. 43 and 44.

"Trading Conflict and Capacity Aliasing in Conditional Branch Predictors" by Michaud, et al., Proceedings of the 24th Annual International Symposium on Computer Architecture, 1997, 9 pages.

"Alternative Implementations of Two–Level Adaptive Branch Prediction", by Tse–Yu Yeh, et al., Department of Electrical Engineering and Computer Science, University of Michigan, Jul. 1992, pp. 124–134.

"Intel's IA–64 Application Developer's Architecture Guide" (Rev 1.0, Order No. 245188–001, May 1999).

Internet Publication "The Alpha 21264 Microprocessor: Out–Of–Order Execution at 600 Mhz" by R.E. Kessler, Aug. 1998, pp. 1–30.

* cited by examiner

Primary Examiner—Reba I. Elmore (57) ABSTRACT

Methods and apparatus for storing data in a multi-level memory hierarchy having at least a lower level cache and a higher level cache. Relevancy information is maintained for various data values stored in the lower level cache, the relevancy information indicating whether the various data values stored in the lower level cache, if lost, could only be generated from corresponding data stored in the higher level cache. If one of the various data values stored in the lower level cache is to be updated, a determination as to whether corresponding data should be stored in the higher level cache is based at least in part on 1) the status of the relevancy information corresponding to the one of the various data values stored in the lower level cache which is to be updated, and 2) whether the updated value which is to be written into the lower level cache matches one or more select data value patterns.

20 Claims, 4 Drawing Sheets

| SYLLABLE_2 | SYLLABLE_1 | SYLLABLE_0 | TEMPLATE BITS |
|---|---|---|---|
| 41 | 41 | 41 | 5 |

METHODS AND APPARATUS FOR INCREASING THE EFFICIENCY OF A HIGHER LEVEL CACHE BY SELECTIVELY PERFORMING WRITES TO THE HIGHER LEVEL CACHE

FIELD OF THE INVENTION

The invention pertains to the storage of data in a multi-level memory hierarchy, and more particularly, to methods and apparatus which increase the efficiency of a higher level cache in the hierarchy by selectively performing writes to the higher level cache.

BACKGROUND OF THE INVENTION

Most microprocessors use multi-level memory hierarchies to store information. For example, most of today's microprocessors store instructions and/or data in a main multi-level memory hierarchy comprising at least three tiers: a low level cache, a high level cache, and a main memory. The low and high level caches are typically implemented as tagged, n-way caches.

Lower levels in a memory hierarchy are designed to be faster than higher levels, while higher levels in a memory hierarchy are designed to store more information. As a result, lower levels in a memory hierarchy are usually much smaller than higher levels, and are constructed and managed in different ways.

The higher access speeds of lower levels come with a cost. This cost may include higher heat, more capacitance, greater development time and cost, and so on.

Most of the time, lower levels in a memory hierarchy simply store smaller subsets of the information which is maintained in higher levels. However, as will be described in the following sections of this disclosure, it is sometimes desirable to use a higher level of a memory hierarchy to store less than all of the information which is stored in a lower level of the memory hierarchy. In such a case, it has been found that the efficiency of the higher level structure can be increased by selectively performing writes to the higher level.

SUMMARY OF THE INVENTION

As computer architectures increasingly rely on parallelism, predication, speculation and the like, a processor's ability to generate and access accurate prediction information such as branch prediction information becomes critical. Heretofore, this need has been met by increasing the number of entries in prediction caches, or by implementing multi-stage prediction algorithms (see, e.g., "Alternative Implementations of Two-Level Adaptive Branch Prediction" by T. Yeh and Y. Patt (Association for Computing Machinery, July 1992). However, better methods and apparatus for managing prediction information such as branch prediction information are needed.

The invention comprises using a multi-level memory hierarchy to manage information (and particularly, prediction information) which is used by a microprocessor. By "multi-level memory hierarchy", it is meant that the same type of prediction information is stored in more than one level of a memory hierarchy. The use of a multi-level memory hierarchy should not be confused with the use of a multi-level prediction algorithm such as that disclosed by Yeh and Patt, supra.

The multi-level memory hierarchy disclosed herein comprises a higher level cache and a lower level cache. In a preferred embodiment of the invention, the lower level cache stores branch prediction information for a number of branch instructions. One type of branch information stored in the lower level cache is branch history and trigger prediction information. Branch history information provides a historical taken/not taken look at the behavior of a branch, and is therefore helpful in predicting the future outcomes (taken or not taken) of a branch. The next predicted outcome of a branch may be embodied in a single bit of trigger prediction information. While branch prediction information such as branch targets can be recalculated every time a branch instruction is fetched into a low level instruction cache, historical branch prediction information such as a branch history can only be recreated through repeated executions of a branch instruction. It has therefore been found that storing a backup of this information in a higher level cache which will not be as readily overwritten when new instructions are fetched into a low level instruction cache is desirable. Unfortunately, limited on-chip resources dictate that even this higher level cache cannot be made large enough to store every branch history which is generated. However, the efficiency of the higher level cache (e.g., the resistance to aliasing, etc.) can be increased by writing into the higher level cache only those branch histories which could not be recreated by a default initializer for the lower level cache.

For example, many branch instructions are stored with static and/or dynamic hint information. A default initializer for a lower level prediction information cache could initialize branch histories stored in the lower level prediction information cache to all logic zeros (if hint information indicates that a branch is usually not taken) or to all logic ones (if hint information indicates that a branch is usually taken). Since most branches are well behaved (i.e., they are typically always taken or always not taken; or they switch from being always taken to always not taken, or vice versa, only infrequently), many branch histories will never change from their default initialization. When this is the case, the storage of these default initialization values in a higher level cache provides no benefit over merely reinitializing the branch histories to their default values. The invention therefore avoids writing some or all default information into the higher level cache, except when the default information needs to overwrite a non-default value which has already been stored in the higher level cache.

In a preferred embodiment of the invention, the higher level cache is implemented as a non-tagged, n-way cache. In such a cache, redundant data is written into differently indexed locations in each of the cache's n ways. A hit is generated by the cache when data values read from a majority of the cache's n ways agree. As the volume of differently addressed data values written to the cache increases, it becomes more likely that a majority of the redundant copies of a data value will be overwritten, eventually leading to the cache generating a miss when an attempt is made to read a given data value. To reduce the volume of writes to such a cache, the invention avoids writing data into the cache when a prior attempt to read the cache has generated a cache miss and updated data which is being written to a lower level cache is simply a default value, or when a prior attempt to read the cache has generated a cache hit on a default value.

While the above summary of the invention particularly discusses the update of branch prediction information which is stored a higher level of a multi-level memory hierarchy, those skilled in the art will readily comprehend how other types of information might be selectively stored and updated in a multi-level memory hierarchy.

The above and other important advantages and objectives of the invention will be further explained in, or will become apparent from, the accompanying description, drawings and claims.

BRIEF DESCRIPTION OF THE DRAWINGS

Illustrative and presently preferred embodiments of the invention are illustrated in the drawings in which.

DESCRIPTION OF THE PREFERRED EMBODIMENT

Many of today's processors incorporate structures known as instruction pipelines. Instruction pipelines increase the efficiency of a processor by enabling a processor to simultaneously process a plurality of instructions. Instruction pipelines can be thought of as instruction assembly lines. As Instruction_0 enters a first stage of the pipeline, Instruction_1 is simultaneously processed in a second stage of the pipeline, Instruction_2 is simultaneously processed in a third stage of the pipeline, and so on. Periodically, a new instruction is clocked into an instruction pipeline, and each instruction being processed in the pipeline is passed to the next stage of the pipeline, or is output from the pipeline.

To maximize instruction execution efficiency, it is desirable to keep instruction pipelines full as often as possible (with an instruction being processed in each stage of the pipeline) such that each periodic clocking of an instruction pipeline produces a useful output. However, whenever there 1) has been a transfer of program flow control from one section of program code to another, 2) instructions have been speculatively fetched and processed, and 3) it is determined that the speculatively fetched and processed instructions should not have been fetched and processed, one or more instruction pipelines will eventually produce an output that is not useful. For each clock cycle that an instruction pipeline produces an output that is not useful, the instruction pipeline has a negative impact on a processor's efficiency.

Program flow control instructions such as branch instructions are one means by which program flow control can be transferred from one section of program code to another. Branch instructions can be conditional or unconditional. A conditional branch instruction determines program flow control based on the resolution of a specified condition. An unconditional branch instruction always results in a transfer of program flow control.

"Branch to instruction X if A>B" is one example of a conditional branch instruction. If A>B, program flow control will transfer to a section of program code beginning with instruction X (i.e., the target code section). If $A \leq B$, program control flow will continue with a section of program code which sequentially follows the conditional branch instruction (i.e., the sequential code section).

Since instruction pipelines can be many stages deep, conditional branch instructions are often fetched before the conditions specified in the branch instructions can be resolved. As a result, processors will sometimes predict the outcomes of branch instructions, and then speculatively fetch and process instructions based on its predictions. When predicting the outcome of a branch instruction, a processor must really make two predictions. First, the processor must predict whether a branch will be taken or not taken. Second, if the branch is predicted to be taken, the processor must predict the target of the branch (i.e., the address to which the branch is likely to transfer program flow control). After a prediction is made, instructions are speculatively fetched from either a target code section (if a branch is predicted to be taken) or a sequential code section (if a branch is predicted to be not taken).

Although many branch prediction algorithms exist, branch mispredictions still occur. By the time a misprediction is identified, it is possible for an instruction pipeline to be processing many instructions which were fetched from an incorrect code section. On encountering such a misprediction, misfetched instructions which are being processed in one or more pipelines must be flushed from the pipelines, and instructions from a correct code section must be fetched and processed through the pipelines.

When flushing instructions from a pipeline, bubbles (or gaps) are injected into the pipeline. Unfortunately, it is sometimes necessary to clock a pipeline through several clock cycles before the instruction pipeline can once again produce a useful output. Since conditional branch instructions and other program flow control instructions are prevalent in program code (e.g., sometimes on the order of once every five instructions), the cumulative effect of branch misprediction can have a significant and detrimental impact on a processor's performance, even when branch prediction accuracy is relatively high.

If branch prediction is to be based on an algorithm other than "branches are always predicted taken" or "branches are always predicted not taken", some means must exist for managing (i.e., generating, storing, accessing, updating, etc.) branch prediction information. A variety of means for storing branch prediction information exist, many of which, for example, comprise only a cache of predicted branch targets and a cache of branch histories (or even a single global branch history register). A branch prediction is therefore made by 1) accessing a branch history, 2) predicting, based on the branch history, whether a branch will be taken or not taken, and 3) if the branch is predicted to be taken, accessing a branch target (or many times, calculating the branch target).

Due to area constraints, each of the above caches is typically small, and as a result, a large number of branch instructions will often map to a single entry (or set of entries) in each of the caches. For example, in a cache of 2-bit branch history counters, a plurality of branch instructions might map to each counter. In one conventional embodiment of such a cache, a counter is incremented when any one of the branches to which it maps is taken. Similarly, a counter is decremented when any one of the branches to which it maps is not taken. A next branch to be predicted, which branch maps to a counter having a value of 10 or 11, is predicted taken. Likewise, a next branch to be predicted, which branch maps to a counter having a value of 00 or 01, is predicted not taken. As a result, a branch prediction is made, and assumed to be correct, regardless of whether a counter has just been updated in response to the outcome of one or more unrelated branches.

The following description discloses a multi-level memory hierarchy for storing prediction information such as branch prediction information. Also disclosed are methods and apparatus for increasing the efficiency and effectiveness of a higher level cache in the memory hierarchy by selectively performing writes to the higher level cache.

Figure 2:
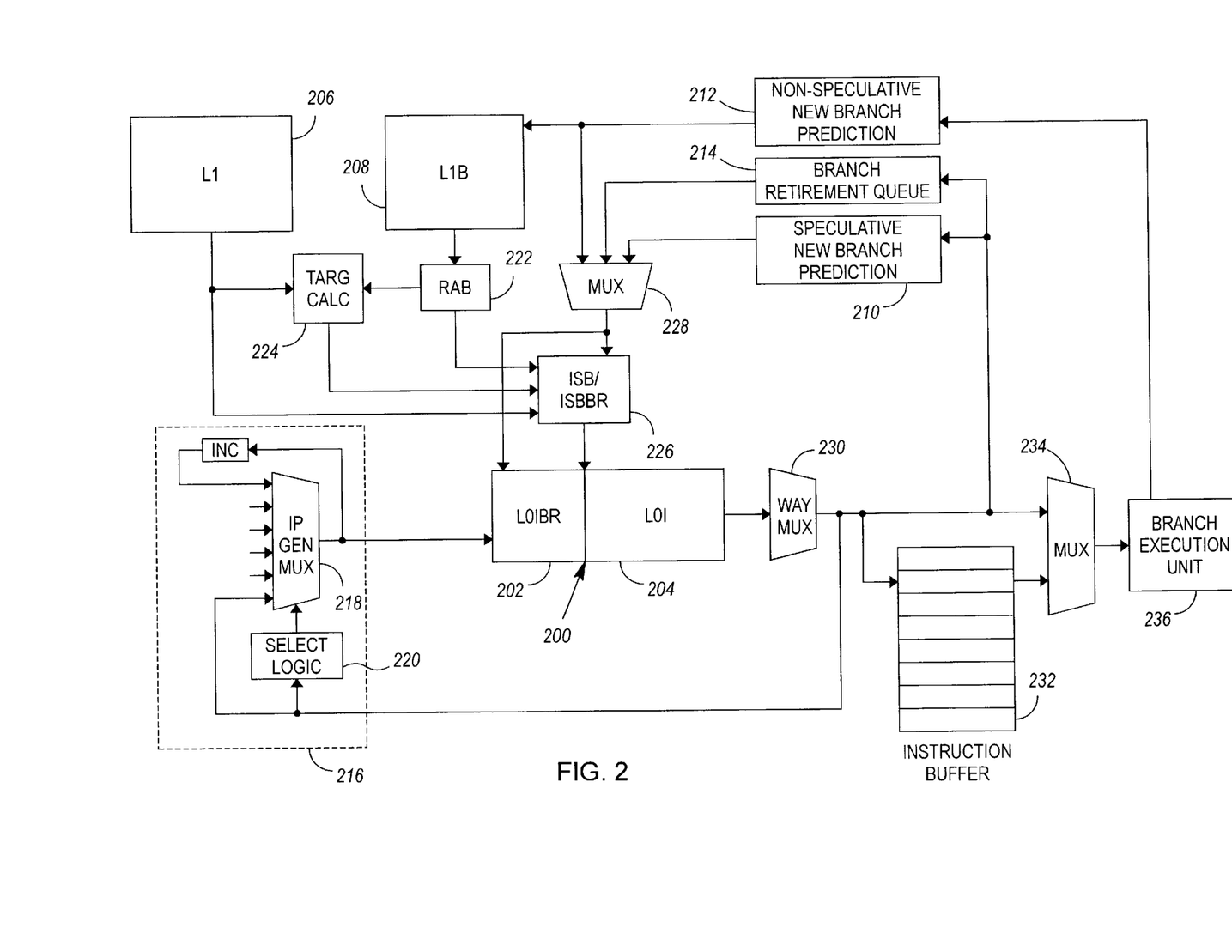
FIG. 2 illustrates various components of a processor, including a multi-level prediction information memory hierarchy and an integrated low level instruction/branch prediction cache.
Figure 5:
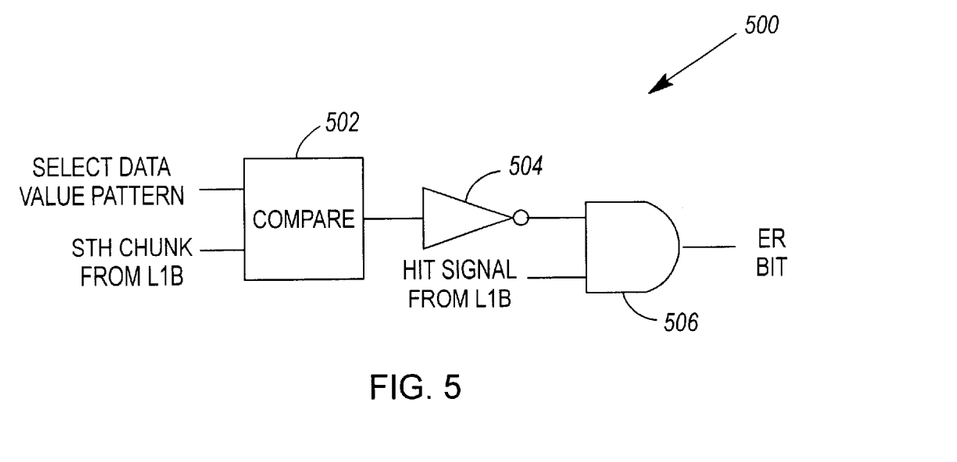
FIG. 5 illustrates an exemplary circuit for determining an initial state of "relevancy information", which relevancy information indicates whether relevant information is stored in the higher level prediction cache of the FIG. 2 memory hierarchy.
Figure 6:
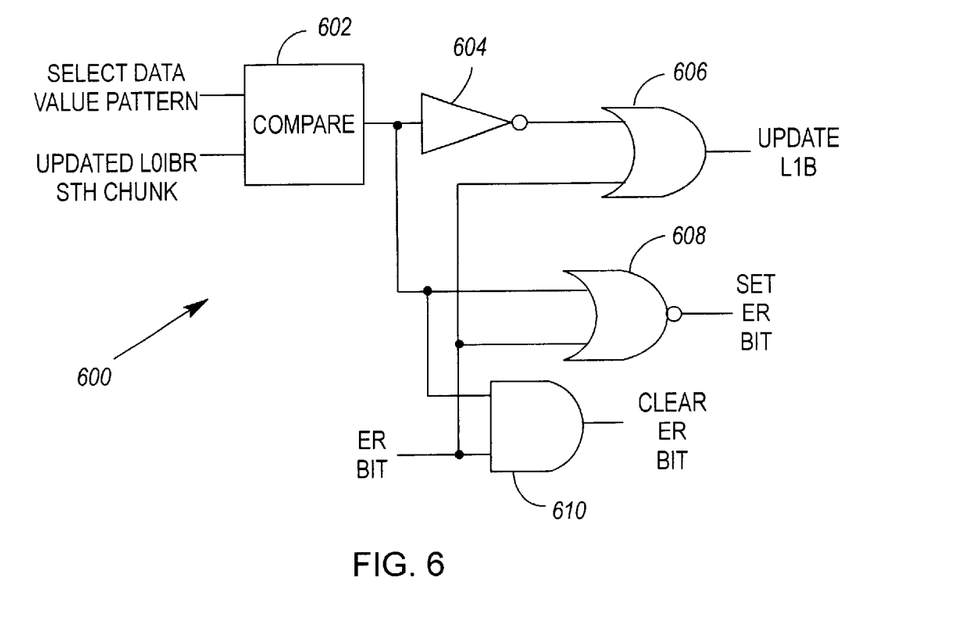
FIG. 6 illustrates an exemplary circuit for determining 1) whether the higher level prediction cache of the FIG. 2 memory hierarchy should be updated, and 2) whether the relevancy information referred to in FIG. 5 should be updated.

The apparatus disclosed in FIGS. 2, 5 & 6 illustrates a general method for storing data such as prediction information. The method comprises maintaining a multi-level memory hierarchy comprising at least a lower level cache (the L0IBR) and a higher level cache (the L1B). The method further comprises maintaining relevancy information (ER bits; FIGS. 5 & 6) for various data values stored in the lower level cache, wherein the relevancy information indicates whether the various data values stored in the lower level cache, if lost, could only be generated from corresponding data stored in the higher level cache. Finally, the method comprises determining, when one of the various data values stored in the lower level cache is to be updated, whether corresponding data should be stored in the higher level cache. This determination is based at least in part on 1) the status of the relevancy information corresponding to the one of the various data values stored in the lower level cache which is to be updated, and 2) whether the updated value which is to be written into the lower level cache matches one or more select data value patterns.

A cache structure for implementing the method described in the above paragraph is also illustrated in FIGS. 2, 5 & 6. The cache structure comprises a higher level cache (L1B) which produces a data output and a hit/miss signal, and a lower level cache (L0IBR) comprising corresponding data and relevancy information entries. Logic receives the data output and the hit/miss signal which are produced by the higher level cache and sets a relevancy information entry in the lower level cache to a first state when the hit/miss signal is indicative of a cache hit and the data output does not carry one or more select data value patterns, and otherwise sets a relevancy information entry in the lower level cache to a second state. Data update logic receives and updates data read from the lower level cache. Finally, additional logic receives relevancy information which corresponds to data read from the lower level cache, along with updated data produced by the data update logic, and updates the higher level cache only when 1) updated data does not match one of the one or more select data value patterns, or 2) updated data does match one of the one or more select data value patterns, but the status of the relevancy information it receives is indicative of said first state.

Having generally described methods and apparatus for increasing the efficiency of a higher level cache by selectively performing writes to the higher level cache, the methods and apparatus will now be described in further detail.

Preferred embodiments of the methods and apparatus described herein implement the Intel®/Hewlett-Packard® IA-64 software architecture. However, those skilled in the art will readily understand how various of the methods and apparatus described herein might be adapted to implement other software architectures. A detailed discussion of the IA-64 software architecture can be found in the "IA-64 Application Developer's Architecture Guide" (Intel, May 1999), which is hereby incorporated by reference for all that it discloses.

IA-64 Software Architecture

Figure 1:
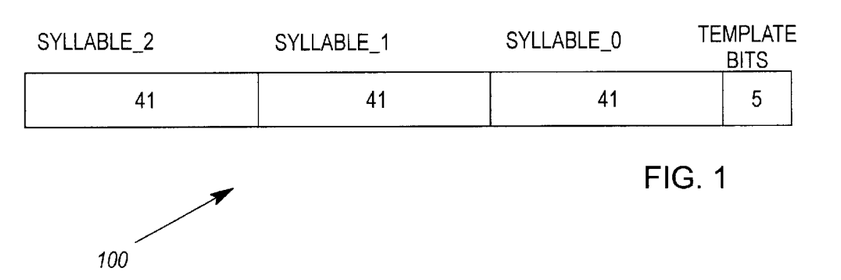
FIG. 1 illustrates an IA-64 instruction bundle.

In IA-64, instructions are fetched in bundles. Each bundle 100 comprises three 41-bit instruction syllables (or slots) and a 5-bit template field, for a total of 128 bits. An exemplary IA-64 instruction bundle 100 comprising syllables 0, 1 and 2, is illustrated in FIG. 1.

The instructions of an instruction bundle 100 are executed sequentially (syllable_0 first, then syllable_1, then syllable_2), unless and until an "unconditional" or "taken" branch instruction transfers program flow control to the first sequential instruction of a different instruction bundle (or until a fault, trap, interrupt or some other event causes a transfer of program flow control). So long as program flow control is not altered, execution of the instructions in one bundle 100 is followed by the execution of instructions in a next sequential bundle.

There are five IA-64 instruction syllable types (M, I, F, B, and L), six IA-64 instruction types (M, I, A, F, B, and L), and 12 basic template types (MII, MI,I, MLX, MMI, M,MI, MFI, MMF, MIB, MBB, BBB, MMB, MFB). An instruction template type specifies the mapping of instruction syllables to execution unit types, as well as the location of "stops". Each basic template type has two versions: one with a stop after the third syllable, and one without. A stop indicates that one or more instructions after the stop may have certain kinds of resource dependencies with respect to one or more instructions before the stop (i.e., a stop enables explicit specification of parallelism). Note that the MI,I and M,MI instruction templates, by definition, have mid-bundle stops (denoted by the commas in these templates). Instructions must be placed in syllables corresponding to their instruction types, and based on a template specification, except for A-type instructions, which can be placed in either I or M syllables. For example, a template specification of MII means that of the three instructions in a bundle 100, the first instruction is a memory (M) or A-type instruction, and the next two instructions are integer (I) or A-type instructions.

The MLX template is a unique template in that it really only holds two instructions, a memory (M) instruction and a long X-type instruction. Currently, an X instruction can only be an integer instruction, and the MLX template is therefore, in reality, an MLI template. The X syllable of the MLX template holds an integer instruction which carries with it twenty-two bits of a "long immediate" value, which twenty-two bits are routed to an integer unit along with forty-one additional bits of the "long immediate" which are held by the L syllable of the MLX template. An LX instruction is therefore a form of integer instruction.

The flow of instruction execution in an IA-64 processor is controlled by an instruction pointer. The instruction pointer (IP) holds the address of the bundle 100 which contains the currently executing IA-64 instruction. The IP is incremented as instruction bundles 100 are executed, and can be set to a new value through execution of a branch instruction (or by other means). Because IA-64 instruction bundles 100 are 16 bytes, and are 16-byte aligned, the least significant four bits of the IP are always zero.

IA-64 software architecture provides for two basic categories of branches: IP-relative branches and indirect branches. An IP-relative branch specifies a branch target address with a signed 20-bit offset, which offset is carried with the IP-relative branch instruction. This offset, when added to the starting address of the instruction bundle containing the IP-relative branch, provides the starting address of a target bundle. The signed 20-bit offset (i.e., 21-bit offset) allows an IP-relative branch to reach ±16 MB.

An indirect branch provides greater reach than is provided by an IP-relative branch, but at a somewhat higher cost. The target bundle of an indirect branch is specified by a value held in one of eight 64-bit branch registers. An indirect branch target therefore needs to be moved into one of the eight branch registers prior to when it is needed (which is prior to when branch prediction hardware relies on the target for the purpose of branch prediction). An indirect branch therefore requires a setup routine such as: MOVL, MOV-to-BR, BR. The MOVL instruction moves a 64-bit value into a general register (GR). The MOV-to-BR instruction then moves the 64-bit general register value to a specified branch register (BR). The BR instruction then executes a branch to a target address which is stored in a specified branch register.

Since the setup routine for an indirect branch involves three instructions, some of which require 64-bit values to be moved, the instructions of an indirect branch's setup routine can at best fit into two instruction bundles. Furthermore, since the three instructions are dependent upon one another, and therefore must be executed sequentially, the execution of an indirect branch takes at least three cycles (as compared to an IP-relative branch, which requires the execution of only a single instruction). Also, the execution of an indirect branch requires the use of at least one available general register and one available branch register. An indirect branch therefore requires a lot of overhead. However, an indirect branch is advantageous over an IP-relative branch in that it can branch to anywhere within IA-64's 64-bit address space.

A branch can be conditional or unconditional. An unconditional branch is always taken. A conditional branch can be taken or not taken. The outcome of a conditional branch must therefore be predicted in some way. One way in which the outcome of a branch can be predicted is via compiler generated "hints". These hints are encoded with a branch instruction at compile time and are then decoded by a processor prior to when the branch instruction is executed.

Following is a description of improved methods and apparatus for implementing the above-described IA-64 software architecture (as well as other software architectures, as will be described). Some of the methods and apparatus relate to better means for generating, storing and managing prediction information (especially branch prediction information).

Instruction Processing and Branch Prediction Hardware

FIG. 2 illustrates a variety of structures for managing instructions and branch prediction information within a processor. The structures comprise, among others, an integrated low level instruction/branch prediction cache 200 (sometimes referred to herein as simply an "integrated low level cache"), distinct higher level instruction 206 and branch prediction 208 caches, and structures which assist in the update of branch prediction information which is stored in the various caches.

1. An Integrated Low Level Instruction/Branch Prediction Cache

A structure which is central to the FIG. 2 apparatus is the integrated low level instruction/branch prediction cache 200. Although functionally operating as a single structure, this integrated low level cache 200 conceptually comprises a low level instruction cache 204 (the L0I) and a low level branch prediction cache 202 (the L0IBR). See also FIG. 3.

In the past, most processors have maintained branch prediction information in a cache which is functionally distinct from a processor's low level instruction cache 204. Part of the reason for this is that branch prediction algorithms which have been used in the past have largely relied on global branch prediction. Global branch prediction is a form of branch prediction in which each retired branch instruction shifts a bit which is indicative of its outcome (either taken or not taken) into a global branch history register. This global branch history register is then used to index a cache of 2-bit counters which stores prediction histories for the various patterns which the bits of the global branch history register can assume.

Each time a retired branch updates the global branch history register, it also updates an appropriate pattern history counter. See, e.g., Yeh & Patt, supra.

The accuracy of a global branch predictor depends heavily on the size of the global history register. There are two reasons for this. First, longer global histories have more information for distinguishing between different prediction scenarios. Second, a longer global history register means a larger table of 2-bit pattern history counters, and thus less counter aliasing. Although global branch predictors can provide a very high level of accuracy when the right ratio of computer program branches to global history register size (and pattern history table size) is maintained, local branch predictors are advantageous for several reasons. For example, as will be described in greater detail later in this description, local branch predictors allow information which predicts a "next fetch outcome" of a branch instruction to be determined at the time of a branch's current fetch (where the information which predicts the next fetch outcome of a branch instruction comprises trigger information for predicting whether the branch instruction will be taken or not taken, and if the branch is predicted to be taken, target information which predicts where the taken branch will be taken to).

Another advantage of local branch prediction is that it scales better for programs comprising a large number of branches. In other words, as the number of branches in a computer program increases, a point is reached where global branch prediction requires more chip area to achieve the same prediction accuracy which is achieved by local branch prediction. Since the IA-64 software architecture is specifically designed for the efficient handling of large computer programs (and thus, programs comprising a relatively greater number of branch instructions), local branch prediction is believed to be a better choice for implementing such an architecture.

Since local branch prediction provides for determining at the time of a branch's current fetch, information which predicts a next fetch outcome of the branch, it makes sense to store information which predicts a branch instruction's next fetch outcome in a cache 202 which is integrated with the cache 204 holding the branch instruction itself. By doing so, the prediction information can simply be looked up and used the next time the branch instruction is fetched. This saves time over having to wait to access a global branch history register and its associated pattern history table after a branch is fetched, and then having to access (or even calculate) a branch target. FIG. 2 illustrates such an integrated low level instruction and branch prediction cache 200.

While one or more caches which collectively function as a branch prediction cache can also be used to store information which predicts a branch's next fetch outcome, there are many advantages to using the integrated low level cache

200 illustrated in FIG. 2. First, local branch prediction requires a more or less one-to-one correspondence between branch instructions and branch prediction information (since branch prediction information is maintained on a per branch basis). While one way to establish such a correspondence is to increase the sizes of one or more stand-alone branch prediction caches, it was decided that a better way to do this was to introduce an integrated low level instruction/branch prediction cache 200.

A low level instruction cache 204 uses complete tagging (i.e., tags which are large enough to uniquely identify the instructions stored therein). The cost of storing these complete tags is significant, and a cache management structure which is able to efficiently handle complete tags is costly to design, test and build. To store branch prediction information on a true per branch basis would be equally as costly. However, the integration of a low level instruction cache 204 and branch prediction cache 202 under a common management structure 300 (FIG. 3) allows one to take advantage of economies of scale. Branch instructions and their corresponding prediction information can be retrieved from an integrated low level cache 200 using a single addressing means.

Figure 3:
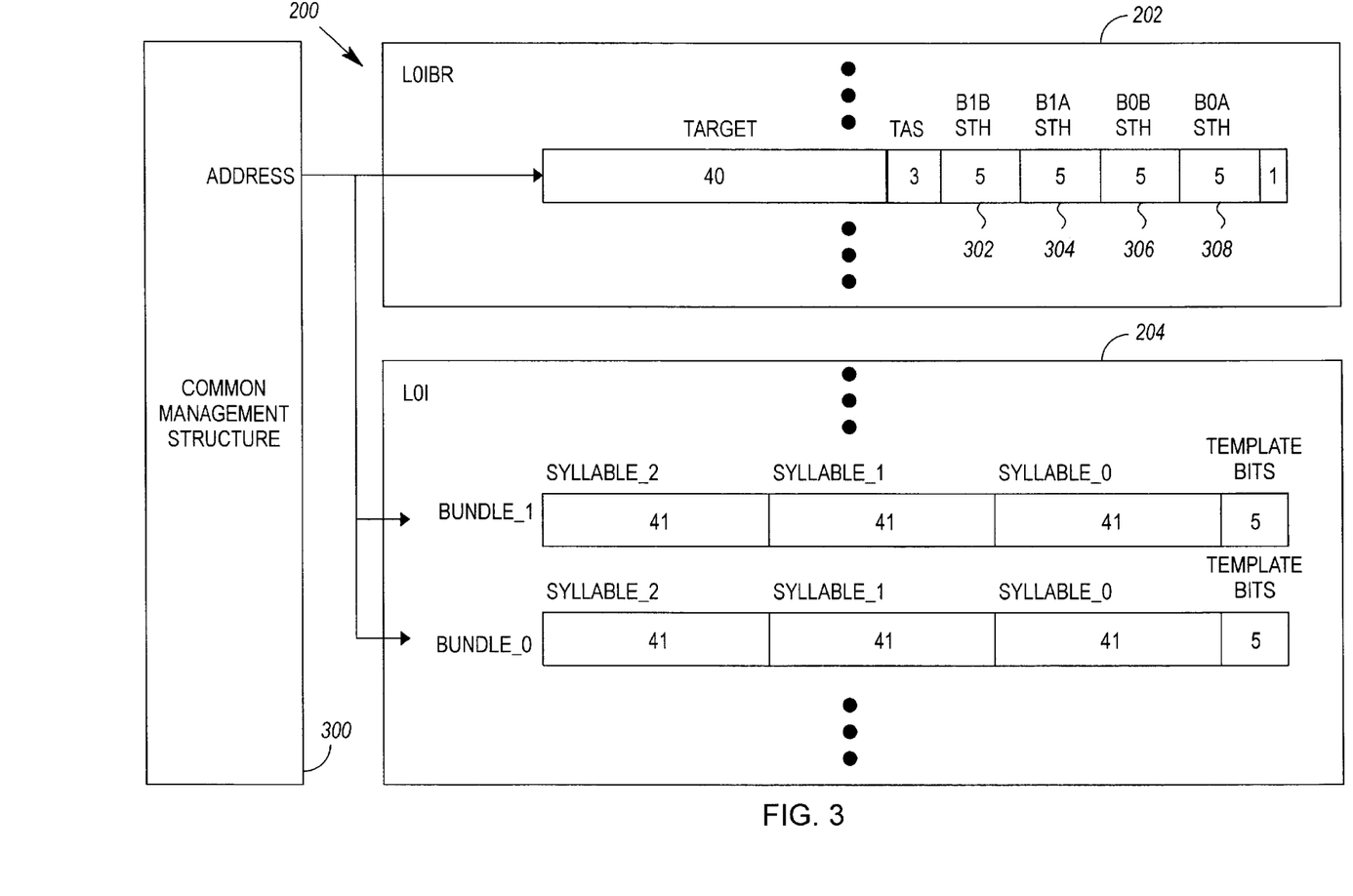
FIG. 3 illustrates a preferred embodiment of the integrated low level cache in the FIG. 2 memory hierarchy.

Furthermore, in order to allow full-speed operation of a processor's instruction pipelines, the access speed of a branch prediction cache 202 necessarily has to be roughly equivalent to that of a processor's low level instruction cache 204. The integration of a branch prediction cache 202 with a low level instruction cache 204 insures such a speed equivalency.

A branch prediction cache could alternatively be implemented using one or more caches which collectively function as a branch prediction cache. However, to implement complete tagging in such a cache(s) would be expensive. Additionally, hardware would be needed to "associate" branch prediction information with the branch instructions to which it corresponds. The cost of implementing a branch prediction cache could be reduced, for example, by using less than complete tagging in the cache. However, this would introduce an uncertainty as to whether information fetched from the branch prediction cache truly corresponds to a branch instruction fetched from a low level instruction cache 204. By integrating low level instruction 204 and branch prediction 202 caches, prediction information correspondence is known to be accurate.

Since not all instructions stored in a low level instruction cache 204 are branch instructions, it necessarily follows that at any given instant, a lot of entries in the branch prediction portion 202 of an integrated low level instruction/branch prediction cache 200 will not be used. However, the advantages of 1) being able to leverage the management structure of a low level instruction cache 204, and 2) always having prediction information ready and available when a branch is fetched, are believed to far outweigh the relatively low density of useful prediction information which might be stored in such a cache 202.

A. The L0I

In a preferred embodiment of the L0I portion 204 of the integrated low level cache 200, instructions are stored in the L0I 204 in bundle pairs. A bundle pair of instructions comprises two instruction bundles, each of which in turn comprises three instruction syllables and a number of template bits. An exemplary instruction bundle pair which might be stored in the L0I 204 is illustrated in FIG. 3 (BUNDLE_0 and BUNDLE_1). The three syllables of each instruction bundle are designed to be executed in order, with syllable_0 being executed first, then syllable_1, and finally syllable_2 (assuming, that is, that an earlier executed branch instruction does not cause program flow control to be transferred to the start of a different instruction bundle). Although program flow control can transfer to the start of either instruction bundle in an instruction bundle pair, when program flow control is transferred to the first sequential bundle of a pair, instruction execution proceeds from the first bundle to the second bundle in an ordered fashion (again, assuming that an earlier executed branch instruction does not cause program flow control to be transferred to the start of a different instruction bundle).

One reason that instructions are preferably stored in the L0I 204 in bundle pair form is to amortize the cost of a fairly large number of address bits which are used to access the L0I 204, over an even larger number of instruction bits.

B. The L0IBR

In a preferred embodiment of the L0IBR portion 202 of the integrated low level cache 200, branch prediction information is stored for each bundle pair of instructions stored in the L0I 204. One form that the L0IBR branch prediction information can assume is illustrated in FIG. 3. The prediction information comprises a number of bits of a predicted target, target correlation data (TAS), and four branch history and trigger prediction chunks 302, 304, 306, 308. The branch history and trigger prediction chunks 302–308 are hereinafter referred to as single-way trigger/history (STH) chunks.

Each of the four STH chunks 302–308 stored in the L0IBR 202 comprises four branch history bits and a trigger prediction bit. The trigger prediction bit predicts whether a branch which is currently stored in the L0I 204 will be taken or not taken at its next fetch. The branch history bits which are stored with a given trigger prediction bit form a record of past taken/not taken outcomes of the branch whose outcome the trigger prediction bit predicts.

Figure 4:
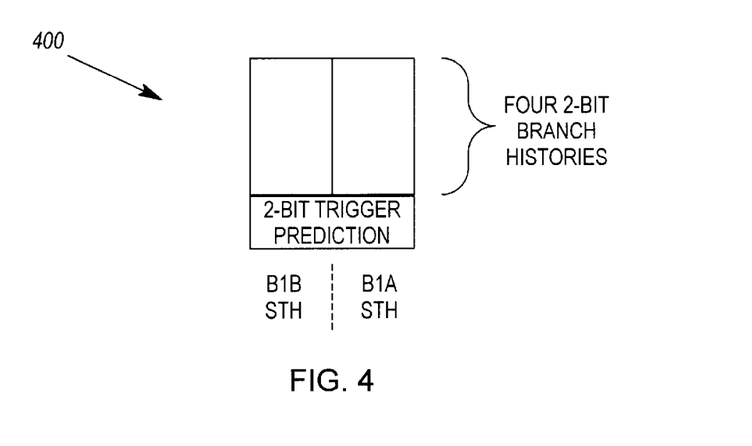
FIG. 4 illustrates the storage of branch histories and trigger prediction information in an encoded form.

Since an instruction bundle 100 is capable of holding up to three branch instructions, it is therefore possible for an instruction bundle to have more branches than there are available STH chunks 303–308 for the bundle 100. STH chunks 302–308 are therefore used in the following manner. When syllable_0 of an instruction bundle 100 does not hold a branch instruction, a distinct STH chunk 302, 304 is allotted for each of the instruction bundle's two remaining syllables. When syllable_0 of an instruction bundle 100 does hold a branch instruction, a pair of STH chunks 302, 304 are used to store branch history and trigger prediction information in an encoded form 400 (FIG. 4). When used to store encoded information, two STH chunks 400 can store branch history and trigger prediction information for all three of an instruction bundle's syllables. Note that the current state of IA-64 architecture only provides one template in which syllable_0 of an instruction bundle can hold a branch. This template is BBB. As a result, anytime syllable_0 of an instruction bundle 100 holds a branch, it is possible (although not guaranteed) that all three of the instruction syllables in the bundle 100 will hold a branch. To streamline the decision as to whether encoded STH chunks 400 should be used, encoded STH chunks 400 are preferably used anytime syllable_0 of an instruction bundle 100 holds a true branch, regardless of whether syllables 1 and 2 actually do hold branch instructions.

FIG. 4 illustrates an encoded pair of STH chunks 400. Note that the encoded pair 400 holds four 2-bit history events and a single 2-bit trigger prediction for its corresponding instruction bundle. A value of "00" for the 2-bit trigger prediction indicates that none of an instruction bundle's branches are predicted to be taken; a value of "01" for the 2-bit trigger prediction indicates that a branch in syllable_2 is predicted to be taken; a value of "10" for the 2-bit trigger prediction indicates that a branch in syllable_1 is predicted to be taken; and a value of "11" for the 2-bit trigger prediction indicates that a branch in syllable_0 is predicted to be taken.

Given current IA-64 instruction templates, the two L0IBR STH chunks 300, 302 which are allotted for an instruction bundle 100 stored in the L0I 204 can be used in one of three ways. First, if an instruction bundle 100 holds only one branch instruction, and the branch instruction does not appear in syllable_0, one STH chunk 300 will store branch history and trigger prediction information for the branch. Second, if an instruction bundle 100 holds two branch instructions, and neither of these branch instructions appears in syllable_0, two STH chunks 302, 304 will be used to individually store branch history and trigger prediction information for the two branches. Third, if an instruction bundle 100 holds a branch instruction in syllable_0, two STH chunks 302, 304 will be used to store encoded branch history and trigger prediction information 400 for the instruction's branches. Note that in the encoded case, two STH chunks 400 can handle branch history and trigger prediction information for up to three branches. However, an encoding of two STH chunks 400 does not necessarily mean that an instruction bundle 100 has three branches.

As will be described later in this description, unused L0IBR STH chunks 302–308 can sometimes be used to store L1B management information.

Each instruction bundle pair stored in the L0I 204 maps to a single branch target (or portion thereof stored in the L0IBR 202. A target therefore maps to the first sequentially executed branch instruction of an instruction bundle having a predicted taken branch, which instruction bundle is the first bundle following a "bundle pair entry point". Since IA-64 software architecture dictates that program flow control can be directed to the start of any instruction bundle 100, a branch instruction may redirect program flow control to either the first (BUNDLE_0) or second (BUNDLE_1) instruction bundle of a bundle pair. It is therefore assumed that when program flow control is directed (or redirected) to one bundle of a bundle pair during a current fetch of the bundle pair, program flow control will be directed to the same bundle at the next fetch of the bundle pair. The point to which program flow control is directed is referred to herein as a bundle pair entry point. Once a bundle pair entry point has been determined, the first predicted taken branch may be determined by assessing the trigger prediction bits corresponding to the instruction bundle pair and then determining which branch instruction of the instruction bundle pair is the first branch instruction after the bundle pair entry point to denote a predicted taken branch.

The target correlation bits which are stored with a target merely map the target to the syllable or branch instruction of an instruction bundle pair for which the target was generated (or mark the target invalid).

One may calculate from the above description that for each instruction bundle pair (256 bits) stored in the L0I portion 204 of the integrated low level cache 200, 63 bits of data are stored in the L0IBR portion 202 of the cache 200 (the L0IBR 202 actually provides 64-bits of storage per instruction bundle pair, one bit of which is currently unused). However, this is only a preferred construction of the L0IBR 202, and the number of bits stored therein can be increased or decreased depending on such factors as the number of target bits which it is desired to store for a given application, the number of history bits per branch which it is desired to store, the number of STH chunks 302–308 per instruction bundle 100 (or bundle pair) which are provided, etc.

2. Higher Level Caches

Note that many instructions which are stored in the integrated low level cache 200 will be non-branch instructions. Corresponding prediction information entries for these instructions will therefore not be used. This is tolerated in order to achieve quick access and economies of scale when storing/accessing prediction information which will be needed by a processor in the immediate future. Prediction information can be fetched from the L0IBR 202 at the same time that corresponding instructions are fetched from the L0I 204, and there is no need to pull this information together from two separate cache structures. However, the FIG. 2 apparatus does not include an integrated higher level instruction and branch prediction cache—in part due to the fact that higher level cache structures are typically much larger and slower than lower level cache structures, and a prediction information portion of a higher level integrated structure would contain too many blank entries (i.e., wasted space). Instead, larger quantities of some of the branch prediction information stored in the L0IBR 202 are stored in a distinct higher level branch prediction cache—the L1B 208. The standalone nature of the L1B 208 enables it to store branch prediction information at a higher density than what is stored in the L0IBR 202.

A. The L1 Cache

A second structure which is disclosed as part of the FIG. 2 apparatus is a second level instruction cache (i.e., the L1 cache 206). The L1 cache 206 is a higher level cache with respect to the low level integrated cache 200, and is designed to store a greater number of instructions than can be stored in the L0I portion 204 of the low level integrated cache 200. Some of the instructions stored in the L1 cache 206 will be copies of instructions which have been loaded into the L0I, and other instructions stored in the L1 206 may be copies of instructions which have yet to be loaded into the L0I 204 (or copies of instructions which have been overwritten in the L0I 204). However, while the L1 cache 206 stores copies of instructions which have been loaded into the L0I 204, the L1 206 preferably does not store copies of the branch prediction information values which have been loaded into the L0IBR 202 (the L1B 208 does this to some extent). Nor does the L1 cache 206 usually store each and every instruction which exists in the L0I 204.

Although the L1 206 preferably does not store copies of the branch prediction information values which have been loaded into the L0IBR 202, the L1 cache 206 preferably stores some branch prediction information. For example, branch prediction hints which are generated by a compiler or the like are often encoded as part of the branch instructions which they hint. As a result, a preferred embodiment of the L1 cache 206 continues to store these hints. However, as will be shown below, there are advantages to storing backup copies of more extensive branch prediction information (such as branch histories) in a cache 208 which is separate from the L1 cache 206. In this manner, a second level branch prediction cache 208 can be formatted and managed differently from the L1 cache 206, and in a manner which is better optimized for the storage of branch prediction information.

B. The L1B

A third structure which is disclosed as part of the FIG. 2 apparatus is a second level branch prediction cache (i.e., the L1B cache 208). The L1B cache 208 is to the L0IBR 202 as the L1 cache 206 is to the L0I 204. The L1B 208 is therefore a higher level cache with respect to the L0IBR 202, and as a result, will typically be larger and somewhat slower than the L0IBR 202.

A preferred embodiment of relevant portions of the L1B cache 208 is described and illustrated in the copending application of James E. McCormick, Jr. entitled "Non-Tagged Prediction Cache" (HP Docket No. 10990035-1). Also note that the preferred embodiment of the L1B 208 is only capable of storing, at most, two of the four L0IBR STH chunks 302–208 which correspond to a particular instruction bundle pair stored in the L0I 204. Thus, the remainder of the branch prediction information which is maintained by the L0IBR 202 is not maintained by the L1B 208. However, one skilled in the art will realize that more, less and/or different types of branch prediction information could be stored in the L1B 208, depending on the needs of a particular application.

With respect to branch history and trigger prediction information, the L1B 208 stores a much larger volume of information than can be stored in the L0IBR 202. Thus, if an instruction bundle pair and its corresponding branch prediction information is deleted from the low level integrated cache 200, branch history and trigger prediction information corresponding to an instruction bundle pair fetched from the L1 cache 206 will hopefully reside in the L1B cache 208. If it does, the low level integrated cache 200 can be largely filled with data fetched from the L1 206 and L1B 208 caches.

As was previously mentioned, the L1B 208 preferably only stores two of the four L0IBR STH chunks 302–308 which correspond to an L0I instruction bundle pair. As a result, a preferred embodiment of the FIG. 2 apparatus only uses the L1B 208 to store L0IBR STH chunks 302–308 when only two STH chunks are used by an instruction bundle pair. Thus, the L1B 208 is used 1) when each instruction bundle of a bundle pair holds a single branch instruction, 2) when one instruction bundle of a bundle pair holds two branch instructions, and the other instruction bundle holds none, and 3) when one instruction bundle of a bundle pair holds three branch instructions (or is presumed to hold up to three branch instructions due to a branch existing in syllable_0 of the instruction bundle), and the other instruction bundle holds none. Note that in the last case, branch history and trigger prediction information for the three branch instructions will be encoded in only two STH chunks 400. In all other cases, the L1B 208 is not used as a backup to the L0IBR 202. Fortunately, the arrangement of branches in an instruction bundle pair usually falls into one of the above three enumerated cases. One skilled in the art will realize that the L1B 208 could be made large enough to store much more L0IBR information if available chip area so permitted.

The preferred relationship between the L0IBR 202 and L1B 208 is generally a write-through relationship. In other words, when branch history and trigger prediction bits are updated in the L0IBR 202, the same bits are written into the L1B 208. However, a preferred arrangement of the L0IBR 202 and L1B 208 incorporates a number of exceptions to this general write-through policy. First, since the L1B 208 only provides storage space for two STH chunks 302, 304 per instruction bundle pair, STH chunks 302, 304 are only written to the L1B 208 when an instruction bundle pair utilizes no more than two STH chunks 302, 304. However, since most instruction bundle pairs hold no more than two branch instructions, this first exception to the general write-through policy has been found to degrade branch prediction performance only minimally.

Another exception to the general write-through relationship between the L0IBR 202 and L1B 208 is that a branch instruction might be prevented from using the L1B 208. For example, one state of the ".cir" hint of the IA-64 software architecture might be used to instruct the FIG. 2 apparatus not to use the L1B 208 for a particular branch instruction. In this manner, a compiler could decide not to use the L1B 208 in predicting certain branch instructions (e.g., certain well-behaved branches which it knows can be predicted just as well using compiler generated hints).

A third exception to the general write-through relationship between the L0IBR 202 and L1B 208 is that an STH chunk 302 is only written to the L1B 208 when the STH chunk 302 is believed to provide information which yields better prediction accuracy than could be achieved if the L0IBR 202 were merely initialized to some default value (e.g., by an initializer which drives all history and trigger prediction bits to logic zeros, or vice versa; perhaps based on the compiler hints which are encoded with a branch instruction). This second exception to the general write-through relationship between the L0IBR 202 and L1B 208 is explained in greater detail in the following paragraphs.

There are many possible ways to initialize an STH chunk 302 in the L0IBR 202. One way to perform such an initialization is to retrieve relevant data from the L1B 208. However, many factors could lead to needed STH chunks 302–308 not being in the L1B 208. For example, 1) if the L1B 208 is smaller than the Li 206, 2) if instruction bundles have been fetched into the Li cache 206, but have yet to be loaded into the L0I 204 for the first time, 3) if not all data stored in the L0IBR 202 is copied into the L1B 208, or 4) if instruction hints indicate that the L1B 208 should not be used or relied on, there will be times when the L1B 208 does not hold a value (or values) corresponding to an instruction bundle pair which is being fetched from the L1 cache 206.

If the L1B 208 does not contain a needed value, then some other means for initializing the L0IBR 202 must exist. One preferred method of initializing an L0IBR STH chunk 302 after encountering an L1B miss is to fill all of the bits of the STH chunk 302 with logic zeros (or alternatively, with logic ones). As a result, the probability of correctly predicting a branch outcome is relatively lower the first time the branch is encountered. However, prediction accuracy increases after the branch has been executed one or more times. As one skilled in the art will appreciate, the hardware which is required to initialize an STH chunk 302 with logic zeros is relatively simple and low-cost to implement.

Another way to initialize an STH chunk 302 after encountering an L1B miss is to fill all of the bits of the chunk 302 with either logic zeros or logic ones, depending on the values assumed by prediction hints which are encoded in the branch instruction (e.g., static or dynamic compiler hints). A variation of this initialization scheme which has provided faster L0IBR initialization is to 1) assume that a branch will not be taken, 2) fill the branch's corresponding STH chunk 302 with all logic zeros, and 3) incur a one cycle penalty to refill the STH chunk 302 with all logic ones if hint information indicates that a fill with logic ones would provide a more accurate branch prediction.

It was previously stated that an L0IBR STH chunk 302 is only written to the L1B 208 when the chunk 302 is believed to hold information which yields better prediction accuracy than could be provided if the L0IBR 202 were merely initialized to some default value. Assuming that an STH chunk 302 is initialized to all logic zeros after encountering an L1B miss, a write of these zeros into the L1B 208 serves no real purpose since a re-initialization of the L0IBR 202 without reference to the L1B 208 would provide the same data. Furthermore, the failure to write L0IBR initialization zeros into the L1B 208 offers significant advantages. The most significant of these advantages is that failing to write L0IBR initialization zeros into the L1B 208 allows the L1B 208 to effectively store a larger quantity of substantive prediction information.

For example, if the L1B 208 is constructed as a non-tagged, n-way cache which stores data using redundancy and index hashing, the writing of a new data value into the L1B 208 has a tendency of overwriting duplicate copies of other data values. In other words, if duplicate copies of data A, data B and data C have already been written into different sets of indexed storage locations in the L1B 208, the write of data D into the L1B could overwrite, in a worst case scenario, one of the duplicate copies of data A, one of the duplicate copies of data B, and one of the duplicate copies of data C. As one can appreciate, if such overwriting occurs with too great a frequency, a time will come when data A, data B and data C no longer exist in the L1B 208. One way to reduce the chance that data A, data B and data C will be overwritten is to avoid writing L0IBR initialization zeros to the L1B 208. If these zeros are written into the L1B 208, and the instruction bundle pair which corresponds to these zeros is subsequently deleted from the L0I 204, the act of reloading the instruction bundle pair into the L0I 202 and reloading the zeros from the L1B 208 provides no greater prediction accuracy than if the L0IBR 202 were just re-initialized to a default value by some lower cost means.

Another advantage of failing to write L0IBR initialization zeros into the L1B 208 is that failing to write this data into the L1B 208 reduces the amount of "write" traffic for the L1B. This is particularly important if the L1B 208 has limited write bandwidth (e.g., if the L1B 208 has only a single read/write port, a reduction in the number of L1B writes would free up more bandwidth for L1B reads). Note however that an all zeros STH chunk 302 does need to be written into the L1B 208 when a substantive non-zero chunk 302 is already maintained in the L1B 208. Otherwise, a reload of data into the L0IBR 202 might result in a load of an out-of-date STH chunk 302.

In order to avoid unnecessary updates of the L1B 208, L1B relevancy information is maintained. This relevancy information is preferably stored in the L0IBR 202 (though it need not be), and is stored for each STH chunk 302, 304 which might at some point be written into the L1B 208 (i.e., it is stored for at most two STH chunks 302, 304 per instruction bundle pair). The relevancy information corresponding to a single STH chunk 302 need only consist of a single bit of information. L1B relevancy bits are initialized when an instruction bundle pair is fetched from the L1 cache 206 and a corresponding attempt is made to fetch prediction information from the L1B cache 208. If an attempted fetch of an STH chunk 302 from the L1B 208 results in an L1B miss, the STH chunk 302 which was to be filled with the missing L1B data is initialized to a default value, and its corresponding L1B relevancy bit is set to "0". The relevancy bit therefore indicates that the L1B 208 does not contain a backup copy of the newly initialized STH chunk 302.

If an attempted fetch of an STH chunk 302 from the L1B 208 results in an L1B hit, but the data read from the L1B 208 is the same as the default value which would be generated for the STH chunk 302, an STH chunk 302 can be filled with the data fetched from the L1B 208. Alternatively, the STH chunk 302 could be set to its default value by a separate default initializer. When the L1B 208 generates a hit, but does not provide prediction information which is any better than that provided by a cheaper L0IBR initialization means, the L1B relevancy bit corresponding to a newly filled STH chunk 302 is also set to "0".

A determination as to whether an L1B hit results in reading all zeros or all ones from the L1B 208 can be made via a simple NOR or AND of the bits read from the L1B 208.

If an attempted fetch of an STH chunk 302 from the L1B 208 results in an L1B hit, and the data read from the L1B 208 provides prediction information which differs from that which can be generated by the afore-mentioned default initializer, then the L1B relevancy bit corresponding to a newly filled STH chunk 302 is set to "1", thereby indicating that the L1B 208 does hold a relevant backup history for the STH chunk 302.

An exemplary circuit 500 for initializing L1B relevancy bits is illustrated in FIG. 5. A comparator 502 compares a select data value pattern (or patterns), such as all logic zeros, with an STH chunk 302 retrieved from the L1B 208. If the two values do not agree (indicated by the output of an inverter 504), and there is a hit in the L1B 208, an appropriate L1B relevancy bit (ER bit) is set to "1". Otherwise it is set to "0".

In a preferred embodiment of the L0IBR, relevancy bits corresponding to the STH chunks 302, 304 used by an instruction bundle pair are stored in STH chunks 306, 308 which are not used to store branch history and trigger prediction information. When a given instruction bundle pair uses more than two of its L0IBR STH chunks 302–308 for the storage of branch history and trigger prediction information, relevancy bits are not stored in the L0IBR 202, and the L1B 208 is not used to backup data for the given instruction bundle pair. If an instruction bundle pair uses only two of its L0IBR STH chunks 302, 304 for the storage of branch history and trigger prediction information, but uses them to form an encoded set 400, a pair of relevancy bits for the encoded set can still be stored in the two remaining L0IBR STH chunks 306, 308, and the encoded set 400 can then be backed up in the L1B 208 in the same manner that two non-encoded STH chunks 302, 304 would be backed up.

3. New Branch Prediction Structures There are two new branch prediction structures 210, 212 illustrated in FIG. 2. The first 210 is part of an instruction pipeline's "front-end" and generates a "speculative" branch prediction upon fetch of a branch. The second 212 is part of an instruction pipeline's "back-end" and generates a "non-speculative" branch prediction upon retirement of a branch.

Upon fetch of an instruction bundle pair and its corresponding prediction information from the integrated low level cache 200, the fetched prediction information, as well as its address, are provided to the speculative new branch prediction structure 210. The speculative new branch prediction structure 210 preferably comprises a number of sub-structures, including a pattern history table (PHT) and an IP-relative adder.

The pattern history table is a table comprising rows of counters which correspond to the various patterns of branch history bits which can be stored as part of an L0IBR STH chunk 302. For example, if an STH chunk 302 holds four bits of branch history, the PHT holds $2^4$ (or 16) counters which correspond to the various patterns which the four history bits can assume. The PHT is preferably addressable on a quasi per-address basis. In other words, a distinct row of 16 counters may not exist for every instruction address, but enough rows of counters are provided such that aliasing is limited to an acceptably low frequency. When a branch retires in the back-end of a pipeline, a counter corresponding to a branch history which existed for the branch at the time it was fetched (i.e., a history retrieved from the L0IBR 202 when the branch was fetched) is updated appropriately (e.g., incremented if the branch was taken, and decremented if the branch was not taken). The FIG. 2 apparatus therefore not only makes a branch prediction based on a history of previous branch outcomes, but it also makes a branch prediction based on the history of a previous history pattern for a branch. The pattern history table, in conjunction with the branch histories stored in the L0IBR 202, forms part of a two-level branch prediction algorithm. A variety of forms which the PHT may assume are disclosed in the article of Yeh and Patt referred to supra. This article is hereby incorporated by reference for all that it discloses.

Note that although the PHT is disclosed as part of the speculative new branch prediction structure 210, the counters maintained by the PHT are only updated non-speculatively.

When an STH chunk 302 is fetched from the L0IBR 202, the trigger portion of the chunk 302 is shifted into its most recent history bit position, and a least recent history bit is shifted out of the STH chunk 302. This new history, as well as a portion of its corresponding bundle address, are then used as indexes into the PHT for determining a next fetch trigger which is to be stored as part of the STH chunk 302.

The speculative new branch prediction structure also comprises an IP-relative adder. After each branch history in STH chunks 302–308 used by a fetched instruction bundle pair is updated, and the updated histories are used to retrieve updated trigger values from the PHT, a most recent bundle pair entry point, in combination with the updated trigger values, are used to determine the first predicted taken branch after the bundle pair entry point, if any. The IP-relative adder then adds the offset carried by the predicted taken branch instruction to an instruction pointer value corresponding to the branch's bundle address, thereby generating a new target prediction.

All of the updated prediction information generated by the speculative new branch prediction structure 210 is then provided to multiplexer 228 for subsequent use in updating the ISBBR 226 (which has yet to be discussed) and/or the L0IBR 202. The new trigger prediction which is generated for a branch by the speculative new branch prediction structure 210, as well as the new target (if the branch is the first predicted taken branch following a most recent bundle pair entry point), form information which predicts the next fetch outcome of a branch instruction stored in the ISB 226 or L0I 204. Since this information is generated speculatively by an instruction pipeline's front-end, it is ready and available at the next fetch of a branch instruction, which next fetch may be before the branch retires from its previous fetch. Furthermore, the prediction information is available for the purpose of resteering an instruction pointer without penalty, as will be discussed later in this description.

Branch prediction information fetched from the L0IBR 202 is also passed down a pipeline (i.e., through rotator mux 234 and a branch execution unit 236 (which may be one of many)). When a branch corresponding to the prediction information retires at the back-end of a pipeline, it is passed to the non-speculative new branch prediction structure 212 along with its current fetch prediction information, at which time a nonspeculative next fetch prediction can be made for the branch. A nonspeculative branch prediction is passed to multiplexer 228, and can be used to fix-up an incorrect speculative prediction which was stored to the ISBBR 226 or L0IBR 202.

As L0IBR STH chunks 302, 304 are updated, the L1B 208 and appropriate L1B relevancy bits stored in the L0IBR 202 must also be updated. Determinations as to whether the L1B 208 and appropriate L1B relevancy bits should be updated are preferably made by the non-speculative new branch prediction structure 212.

Each time the non-speculative new branch prediction structure 212 determines that an L0IBR STH chunk 302 needs to be updated, it must also determine whether the L1B 208 and a corresponding L1B relevancy bit stored in the L0IBR 202 must also be updated. In a preferred embodiment of the non-speculative new branch prediction structure 212, an updated STH chunk 302 is written into the L1B 208 based on 1) the status of the relevancy information corresponding to the last fetch of the STH chunk 302 from the L0IBR 202, and 2) a determination as to whether an updated STH chunk 302 which is to be written into the L1B 208 matches one or more select data value patterns. The select data value patterns should preferably coincide with one or more of the values to which a default initializer for the L0IBR 202 can initialize an STH chunk 302.

For example, a determination that the L1B 208 should be updated can be made when an updated STH chunk 302 does not match one of the one or more select data value patterns. A determination that the L1B 208 should be updated can also be made when the status of an appropriate L1B relevancy bit indicates that the L1B 208 contains relevant data which needs to be kept current so as to avoid hitting on an incorrect STH value when the L1B 208 is accessed in the future.

An exemplary circuit 600 for determining whether the L1B 208 needs to be updated is illustrated in FIG. 6. A comparator 602 compares a select data value pattern (or patterns) with an updated STH chunk 302. If the two values do not agree (indicated by the output of the inverter 604), the L1B 208 is updated. Also, if an L1B relevancy bit (ER bit) indicates that the L1B 208 contains relevant data, then the L1B 208 needs to be updated so as to keep the L1B data current. As a result, an OR 606 of the above two possibilities determines whether an L1B update occurs.

An exemplary circuit 600 for updating L1B relevancy bits is also illustrated in FIG. 6. If the two values input to the comparator 602 do not agree, and a corresponding ER bit is currently not set (e.g., it is a logic zero, and it indicates that no relevant information currently exists in the L1B 208), then the ER bit is set (indicated by the output of the NOR gate 608). If the two values input to the comparator 602 do agree, and the ER bit is set (e.g., it is a logic one), then the L1B relevancy bit is cleared (indicated by the output of the AND gate 610). If neither of the above conditions is met, the state of an ER bit can remain unchanged. Note that when the state of an updated ER bit matches the state of an existing ER bit, an update of the bit may be foregone using appropriate logic.

4. Branch Retirement Queue Working in cooperation with the new branch prediction structures 210, 212 is a branch retirement queue 214. When a branch instruction is fetched for execution, the speculative new branch prediction structure 210 updates the L0IBR 202. When a branch instruction retires (i.e., when execution of the branch instruction is completed), the branch retirement queue 214 assists the non-speculative new branch prediction structure 212 in fixing-up incorrect L0IBR updates. The branch retirement queue 214 also aids in fixing-up the L0IBR 202 when an instruction pipeline is flushed before a branch has a chance to retire.

The branch retirement queue 214 is preferably implemented as a 16 entry queue which is divided into two eight entry banks. When branch prediction information is read from the L0IBR 202, the prediction information is written into the branch retirement queue 214. After a branch retires, it is removed from the queue 214. When a pipeline flush is encountered, the entries in the branch retirement queue 214 are written back into the ISBBR 226 and/or L0IBR 202.

5. Instruction Pointer Generator

The FIG. 2 apparatus also comprises an instruction pointer generator 216 (IP generator). At the heart of the IP generator 216 is an IP generator multiplexer 218 (IP Gen Mux). Triggers of branches fetched from the L0IBR 202 are ORed together and provided to selection control logic 220 for the IP Gen Mux 218. A target which is associated with the triggers is provided to a data input of the IP Gen Mux 218. The IPgen Mux 218 also receives other data inputs, including an address which is incremented by one over the IP address which was previously generated by the IP Gen Mux 218. Unless a branch instruction directs otherwise, the IP is incremented by one bundle address each time an instruction bundle is executed. However, a branch instruction can cause bits of a target address to overwrite part or all of the previous value of the IP.

Since predicted branch triggers and targets are stored in the L0IBR 202, and are fetched upon fetch of a corresponding branch instruction, they can be provided to the IP generator 216 without a resteer penalty, and no delay is incurred due to a need to separately fetch a branch history, check its validity, calculate a trigger prediction, and then fetch or calculate a target address (if necessary). As a result, the integrated low level cache 200 and its associated branch prediction hardware enable an instruction pointer resteer which does not require bubbles to be injected into an instruction pipeline.

Note that the instruction pointer's ability to address instructions and prediction information stored in a single cache reduces the load which the instruction pointer must drive, thereby allowing it to drive data more quickly.

Overall Structure/Operation

When instructions which are needed by an instruction pipeline do not already reside in the L0I portion 204 of the integrated low level cache, a fetch process issues a request for data to the L1 206 and L1B 208 caches. Data fetched from the L1B 208, if any, is temporarily stored in a structure which is designated in FIG. 2 as the RAB 222 (a buffer). When an instruction bundle pair is returned from the L1 cache 206, the instruction bundle pair, including the templates of its instruction bundles and any STH chunks 302–308 retrieved from the L1B 208 are used to calculate a target for the first predicted taken branch of the bundle pair (if any). If STH chunks 302–308 are not stored in the L1B 208, default values for these chunks are also generated. The STH chunks 302–308, a number of target bits, target correlation bits, and instruction bundle pair are all provided to the ISB/ISBBR 226. The ISB/ISBBR 226 serves as a buffer for respectively filling entries in the integrated low level cache 200.

When an instruction bundle pair is fetched from the L0I 204, its corresponding branch prediction information is fetched from the L0IBR 202. This includes information which predicts the current fetch outcomes of branch instructions in the bundle pair.

When an instruction bundle pair is fetched from the L0I/L0IBR 200, L0IBR target information, if any, is provided as a data input to the IP Gen Mux 218, and trigger prediction information from relevant STH chunks 302 is ORed together and presented to the select logic 218 for the IP Gen Mux 218. Thus, a quick one-cycle resteer of the instruction pointer is possible.

All L0IBR information is presented to the new branch prediction structures 210, 212, as well as to the branch retirement queue 214, for purposes which have already been described. Of note, information which predicts a next fetch outcome of a branch instruction is speculatively determined by the speculative new branch prediction hardware 210, and is written back into the ISBBR 226 and/or L0IBR 202 so that it is available before the next fetch of a branch instruction. As a result, valid next fetch prediction information is always available.

Instructions which are fetched from the L0I 204 are placed in an instruction buffer 232, and are sequentially routed to appropriate execution units (e.g., branch execution unit 236) via a rotator mux 234.

Outputs of the new branch prediction structures 210, 212 and the branch retirement queue 214 are provided to a switching means (e.g., a multiplexor 228), which thereafter provides updated information to the L0IBR 202, either directly, or by way of the ISBBR 226.

Alternatives

The above disclosure has referred to a processor which fetches instructions in bundle pairs. As a result, a plurality of branch prediction information entries which map to a bundle pair of instructions has been discussed. However, it is believed to be within the scope of the invention to manage branch prediction in a similar manner for processors which fetch instructions singularly, in bundles, or in bundle groups (such as a bundle pair).

The above disclosure has also referred to IA-64 instruction bundles throughout. When the methods and apparatus disclosed herein are used to manage prediction information on a bundle basis, it is believed to be within the scope of the invention to manage prediction information for bundles having alternate forms. For example, an instruction bundle might comprise more or fewer instruction bundles. An instruction bundle might also comprise a different template form, or no template at all, as might be the case if each instruction syllable could only accept a certain type of instruction, of if each instruction conveyed instruction type information.

It is also noted that any number and/or types of branch prediction information may be stored in the integrated low level cache 200. The selection of which types of information are stored in the L0IBR 202 (and how much information is stored in the L0IBR 202) might vary depending on a particular application. However, more or less prediction information could be stored in the L0IBR (and the L1B). For example, the 40-bits of IA-64 target information could be increased to a full 64-bits of IA-64 target information. Likewise, the length of branch histories stored for each branch instruction in the L0I 204 could be increased or decreased, or the number of such branch histories (or STH chunks 302–308) made available could be increased or decreased.

In addition, various portions of the FIG. 2 apparatus may be implemented together (as shown) or individually, with separately implemented portions providing only some of the advantages provided by the FIG. 2 apparatus as a whole.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A computer based method of storing data, comprising:
    a) maintaining a multi-level memory hierarchy comprising at least a lower level cache and a higher level cache;
    b) maintaining relevancy information for various data values stored in the lower level cache, wherein the relevancy information indicates whether the various data values stored in the lower level cache, if lost, could only be generated from corresponding data stored in the higher level cache; and
    c) if one of the various data values stored in the lower level cache is to be updated, determining whether corresponding data should be stored in the higher level cache, based at least in part on:
        i) the status of the relevancy information corresponding to the one of the various data values stored in the lower level cache which is to be updated; and
        ii) whether the updated value which is to be written into the lower level cache matches one or more select data value patterns.

2. A method as in claim 1, wherein a determination that data should be stored in the higher level cache is only made when:
    a) an updated value which is to be written into the lower level cache does not match one of the one or more select data value patterns; and
    b) an updated value which is to be written into the lower level cache does match one of the one or more select data value patterns, and the status of the relevancy information indicates that a data value which is to be updated in the lower level cache, if lost, could only be generated from corresponding data stored in the higher level cache.

3. A method as in claim 1, further comprising, when data is stored in the higher level cache, updating the relevancy information which is maintained for corresponding data stored in the lower level cache.

4. A method as in claim 1, further comprising, when data is stored in the higher level cache, determining whether the relevancy information which is maintained for corresponding data stored in the lower level cache needs to be updated, and if an update of the relevancy information is needed, performing the update.

5. A method as in claim 1, further comprising, initially storing a given data value in the lower level cache and initializing any relevancy information which is maintained for the given data value by:
    a) attempting to fetch from the higher level cache, data which corresponds to the given data value;
    b) if data which corresponds to the given data value is fetched from the higher level cache,
        i) generating the given data value from the data which was fetched from the higher level cache, and storing the given data value in the lower level cache; and
        ii) initializing the relevancy information which is maintained for the given data value to a first state; and
    c) if data which corresponds to the given data value is not fetched from the higher level cache,
        i) setting the given data value to a default value, and storing the default value in the lower level cache; and
        ii) initializing the relevancy information which is maintained for the given data value to a second state.

6. A method as in claim 1, further comprising, initially storing a given data value in the lower level cache and initializing any relevancy information which is maintained for the given data value by:
    a) attempting to fetch from the higher level cache, data which corresponds to the given data value;
    b) if data which corresponds to the given data value is fetched from the higher level cache, and the fetched data does not match one of the one or more select data value patterns,
        i) generating the given data value from the data which was fetched from the higher level cache, and storing the given data value in the lower level cache; and
        ii) initializing the relevancy information which is maintained for the given data value to a first state;
    c) if data which corresponds to the given data value is fetched from the higher level cache, and the fetched data value does match one of the one or more select data value patterns,
        i) generating the given data value from the data which was fetched from the higher level cache, and storing the given data value in the lower level cache; and
        ii) initializing the relevancy information which is maintained for the given data value to a second state; and
    d) if data which corresponds to the given data value is not fetched from the higher level cache,
        i) setting the given data value to a default value and storing the default value in the lower level cache; and
        ii) initializing the relevancy information which is maintained for the given data value to said second state.

7. A method as in claim 1, further comprising, initially storing a given data value in the lower level cache and initializing any relevancy information which is maintained for the given data value by:
    a) attempting to fetch from the higher level cache, data which corresponds to the given data value;
    b) if data which corresponds to the given data value is fetched from the higher level cache, and the fetched data value does not match one of the one or more select data value patterns,
        i) generating the given data value from the data value which was fetched from the higher level cache, and storing the given data value in the lower level cache; and
        ii) initializing the relevancy information which is maintained for the given data value to a first state;
    c) if data which corresponds to the given data value is fetched from the higher level cache, and the fetched data value does match one of the one or more select data value patterns,
        i) setting the given data value to a default value and storing the default value in the lower level cache; and
        ii) initializing the relevancy information which is maintained for the given data value to a second state; and
    d) if data which corresponds to the given data value is not fetched from the higher level cache,
        i) setting the given data value to a default value and storing the default value in the lower level cache; and
        ii) initializing the relevancy information which is maintained for the given data value to its second state.

8. A method as in claim 1, wherein the one or more select data value patterns consist of a single, all logic zeros value pattern.

9. A method as in claim 1, wherein the one or more select data value patterns consist of a single, all logic ones value pattern.

10. A method as in claim 1, wherein the one or more select data value patterns comprise an all logic zeros value pattern and an all logic ones value pattern.

11. A method as in claim 1, wherein:
 a) the relevancy information which is maintained for various data values stored in the lower level cache is maintained on a per data value basis; and
 b) the relevancy information which is maintained per data value stored in the lower level cache consists of a single bit of information.

12. A method as in claim 1, wherein the various data values stored in the lower level cache, and any corresponding data stored in the higher level cache, comprises branch prediction information.

13. A method as in claim 12, wherein:
 a) a determination that data should be stored in the higher level cache is only made when:
  i) an updated value which is to be written into the lower level cache does not match one of the one or more select data value patterns; and
  ii) an updated value which is to be written into the lower level cache does match one of the one or more select data value patterns, and the status of the relevancy information indicates that a data value which is to be updated in the lower level cache, if lost, could only be generated from corresponding data stored in the higher level cache;
 b) the relevancy information which is maintained for various data values stored in the lower level cache is maintained on a per data value basis;
 c) the relevancy information which is maintained per data value stored in the lower level cache consists of a single bit of information; and
 d) the relevancy information is maintained in the lower level cache.

14. A method as in claim 13, wherein the higher level cache is a non-tagged, n-way cache.

15. A method as in claim 14, wherein the one or more select data value patterns consist of a single, all logic zeros value pattern.

16. A method as in claim 1, wherein the various data values stored in the lower level cache, and any corresponding data stored in the higher level cache, comprise branch history and trigger prediction information.

17. A method as in claim 1, wherein the relevancy information is maintained in the lower level cache.

18. A method as in claim 1, wherein the higher level cache is a non-tagged, n-way cache.

19. A cache structure, comprising:
 a) a higher level cache which produces a data output and a hit/miss signal;
 b) a lower level cache comprising corresponding data and relevancy information entries;
 c) logic which receives the data output and the hit/miss signal which are produced by the higher level cache and sets a relevancy information entry in the lower level cache to a first state when the hit/miss signal is indicative of a cache hit and the data output does not carry one or more select data value patterns, and otherwise sets a relevancy information entry in the lower level cache to a second state;
 d) data update logic which receives and updates data read from the lower level cache; and
 e) logic which receives relevancy information which corresponds to data read from the lower level cache, along with updated data produced by said data update logic, and updates the higher level cache only when:
  a) updated data does not match one of the one or more select data value patterns; and
  b) updated data does match one of the one or more select data value patterns, but the status of the relevancy information it receives is indicative of said first state.

20. A cache structure as in claim 19, wherein the higher level cache is a non-tagged, n-way cache.

* * * * *